(12) United States Patent
Stanley et al.

(10) Patent No.: US 7,421,914 B2
(45) Date of Patent: Sep. 9, 2008

(54) CALIPER APPARATUS

(75) Inventors: Christopher Ian Stanley, West Lothian (GB); Juergen Abendroth, Spelle (DE)

(73) Assignee: Weatherford/Lamb, Inc., Houston, TX (US)

( * ) Notice: Subject to any disclaimer, the term of this patent is extended or adjusted under 35 U.S.C. 154(b) by 341 days.

(21) Appl. No.: 11/230,591

(22) Filed: Sep. 20, 2005

(65) Prior Publication Data

US 2006/0071663 A1 Apr. 6, 2006

Related U.S. Application Data

(60) Provisional application No. 60/611,488, filed on Sep. 20, 2004.

(51) Int. Cl.
*G01B 7/12* (2006.01)
(52) U.S. Cl. ..................... 73/865.8; 33/544.3
(58) Field of Classification Search .......... None
See application file for complete search history.

(56) References Cited

U.S. PATENT DOCUMENTS

| | | | |
|---|---|---|---|
| 3,466,926 A * | 9/1969 | Perkov et al. ............ 73/152.59 |
| 3,974,680 A * | 8/1976 | Beaver .................... 73/40.5 R |
| 4,301,677 A * | 11/1981 | Fisher ......................... 73/105 |
| 4,443,948 A * | 4/1984 | Reeves ..................... 33/544.3 |
| 4,457,073 A | 7/1984 | Payne |
| 4,522,063 A | 6/1985 | Ver Nooy |
| 4,524,526 A * | 6/1985 | Levine ........................ 33/312 |
| 4,710,710 A | 12/1987 | Flora et al. |
| 4,879,685 A | 11/1989 | Takemae |
| 4,953,412 A | 9/1990 | Rosenberg et al. |
| 4,964,059 A | 10/1990 | Sugaya et al. |
| 5,385,049 A | 1/1995 | Hunt et al. |
| 5,540,096 A | 7/1996 | Woodcock et al. |
| 6,067,846 A | 5/2000 | Hill et al. |
| 6,772,637 B2 | 8/2004 | Bazarov et al. |
| 2003/0136195 A1 * | 7/2003 | Krieg et al. ................... 73/628 |
| 2004/0111910 A1 * | 6/2004 | Yonemura et al. ............. 33/544 |
| 2004/0261547 A1 | 12/2004 | Russell et al. |
| 2005/0223825 A1 * | 10/2005 | Janssen .................... 73/865.8 |

FOREIGN PATENT DOCUMENTS

| | | | |
|---|---|---|---|
| EP | 0 312 761 | * | 4/1989 |
| EP | 1 362 979 | | 11/2003 |
| EP | 1 376 048 | | 1/2004 |
| WO | WO 97/02452 | | 1/1997 |

OTHER PUBLICATIONS

EP Search Report, Application No. 05108598.3, dated Dec. 13, 2005.

* cited by examiner

*Primary Examiner*—Robert R Raevis
(74) *Attorney, Agent, or Firm*—Patterson & Sheridan, L.L.P.

(57) ABSTRACT

The present invention generally relates to an apparatus and method for detecting the physical condition of a tubular. In one aspect, an apparatus for use in a tubular is provided. The apparatus includes a body and a drive member for urging the apparatus through the tubular. The apparatus further includes at least two independent caliper assemblies capable of generating data representative of an interior surface of the tubular, wherein each caliper assembly includes an independent force sensor with a sensing member operatively attached thereto. In another aspect, a method for obtaining data in a tubular is provided. In yet another aspect, an apparatus for collecting data in a tubular is provided.

20 Claims, 2 Drawing Sheets

CALIPER APPARATUS

CROSS-REFERENCE TO RELATED APPLICATIONS

This application claims benefit of U.S. Provisional Patent Application Ser. No. 60/611,488, filed Sep. 20, 2004, which application is herein incorporated by reference in its entirety.

BACKGROUND OF THE INVENTION

1. Field of the Invention

Embodiments of the present invention generally relate to a completion operation. More particularly, the present invention relates to an apparatus and a method for generating data representative of a condition of a tubular.

2. Description of the Related Art

The safe and continuous operation of hydrocarbon wellbores and pipeline networks is essential to the operators and users of such networks. Accordingly, such wellbores and pipeline networks are cleaned and inspected at regular intervals to ensure their operational integrity.

The conventional approach to inspection of operating pipelines is for the tubular string to be precleaned several times using a "dumb" pig. The dumb pig, without any on-board intelligence, typically operates to scrape and remove debris such as wax, scale, sand, and other foreign matter from the tubular. In a newly formed pipeline with a new tubular string, the step of precleaning may not be required. In either case, a detailed inspection is subsequently performed by an inspection pig or caliper tool, which makes detailed measurements of the tubular string to determine the internal condition of the tubular. The inspection pig is typically equipped with technologies of varying sophistication. For example, the inspection pig may include a mechanism for measuring an interior surface of the tubular string.

A typical inspection pig includes multiple caliper arm assemblies for sensing changes in the contour of an interior surface of the pipeline. The caliper arm assemblies are generally interconnected to each other through various mechanical linkages. In addition, the caliper arm assemblies are typically connected to a single electronic sensor for receiving a signal from the caliper arm assemblies in response to the change in the contour of the interior surface of the pipeline. An example of an inspection pig is disclosed in U.S. Pat. No. 4,953,412, which is incorporated herein by reference in its entirety. The inspection pig disclosed in the '412 patent includes multiple finger mechanisms or caliper arms attached to a flow cup. The multiple finger mechanisms are interconnected to each other through an integrator plate assembly and other mechanical linkages. As a result, the movement of one of the finger mechanisms causes each of the other finger mechanisms to be affected. For instance, as the inspection pig travels though a pipeline, the external peripheral edge of the cup conforms to the interior configuration of the pipeline and as it changes contour this change is transmitted through the fingers and mechanical linkages to an integrator plate and subsequently to a single electronic sensor.

Although the arrangement of the typical inspection pig is functional, there are several shortcomings. One shortcoming is that the mechanical linkage that interconnects the caliper arm assemblies is bulky and therefore limits the number of caliper arm assemblies employed in the inspection pig, thus reducing the accuracy of the inspection operation by limiting the contact points between the inspection pig and the interior of the pipeline. Another shortcoming is that the caliper arm assemblies are interconnected through various mechanical linkages to a single electronic sensor. This arrangement limits the ability of the inspection pig to respond to multiple, simultaneous changes in the contour of the pipeline because the single sensor receives one signal at a time. As a result, the accuracy of the inspection operation is reduced.

There is a need therefore, for an inspection pig having a compact caliper arm assembly arrangement. There is yet a further need for an inspection pig having an independent sensor for each caliper arm assembly. Additionally, there is a further need for an improved inspection pig.

SUMMARY OF THE INVENTION

The present invention generally relates to an apparatus and method for detecting the physical condition of a tubular. In one aspect, an apparatus for use in a tubular is provided. The apparatus includes a body and a drive member for urging the apparatus through the tubular. The apparatus further includes at least two independent caliper assemblies capable of generating data representative of an interior surface of the tubular, wherein each caliper assembly includes an independent force sensor with a sensing member operatively attached thereto.

In another aspect, a method for obtaining data in a tubular is provided. The method includes urging a measurement tool through the tubular. The measurement tool having at least two independent caliper assemblies, wherein each caliper assembly includes an independent force sensor and a sensing member operatively attached thereto. The method further includes sensing a change in a configuration of an interior surface of the tubular by the sensing member and sending a signal from the sensing member to the force sensor. Additionally, the method includes collecting and storing data from each independent force sensor, wherein the data is characteristic of the change in the configuration of the interior surface of the tubular.

In yet another aspect, an apparatus for collecting data in a tubular is provided. The apparatus includes a body having a drive member configured to urge the apparatus through the tubular. The apparatus further includes at least two caliper assemblies capable of generating independent data representative of an interior surface of the tubular, wherein each caliper assembly includes an independent force sensor and arm. Additionally, the apparatus includes a computer assembly for collecting and storing data from each caliper assembly.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In general, there is provided an apparatus for, and method of, detecting the physical condition of a tubular by employing a plurality of individual caliper arm assemblies. A caliper tool is an apparatus for obtaining data along the entire length of the tubular, wherein the data is representative of the physical condition of the tubular. However, as defined herein, the caliper tool may pertain to any measurement tool that is movable through a tubular. It will be appreciated that the term "condition" with respect to a tubular, may embrace a variety of different and independent tubular factors such as debris deposits, protrusions, joints, bends, etc., the combination of which will provide an overall tubular condition profile. To better understand the novelty of the apparatus of the present invention and the methods of use thereof, reference is hereafter made to the accompanying drawings.

Figure 1:
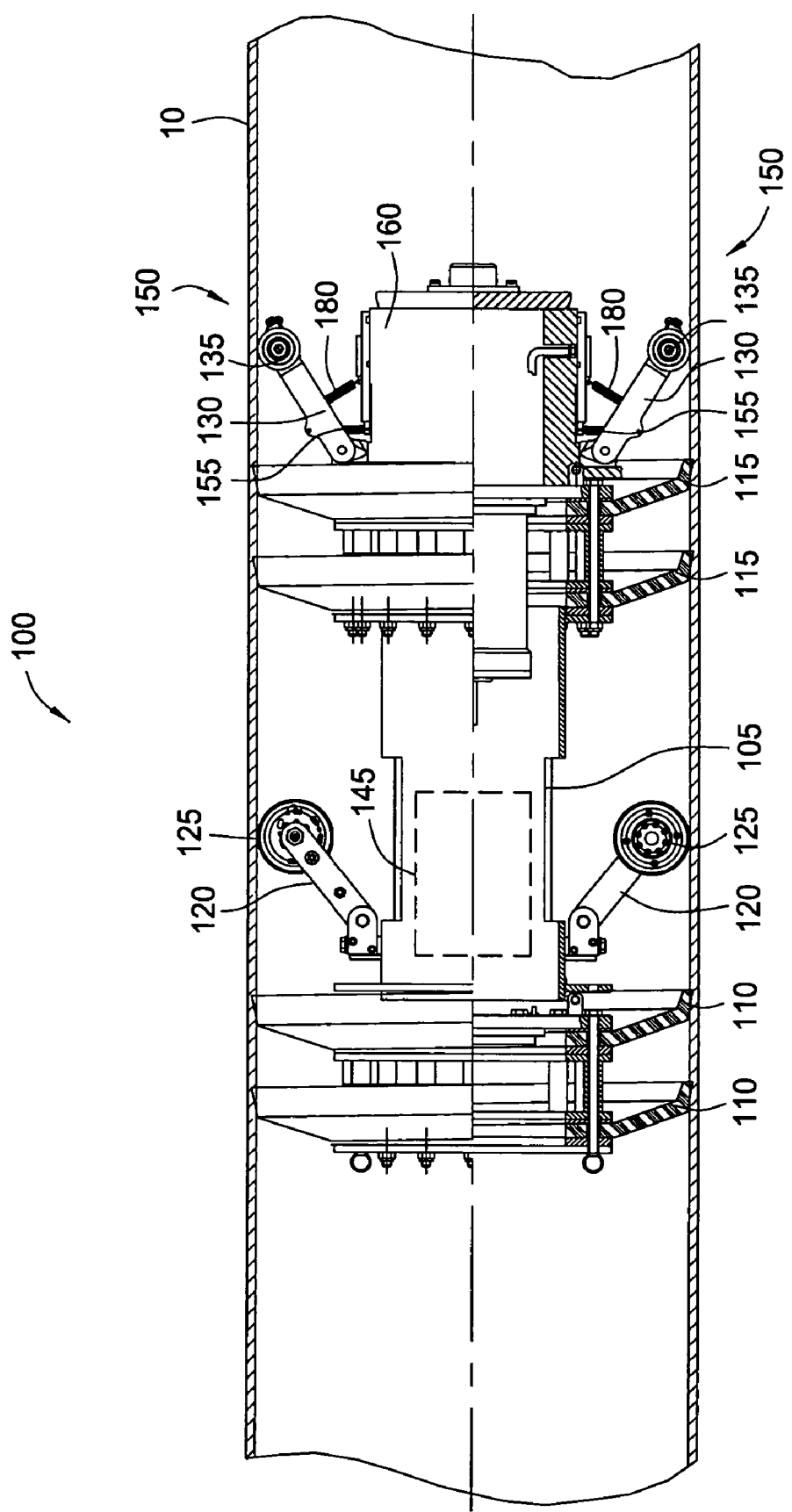
FIG. 1 is a view illustrating one embodiment of a caliper tool of the present invention.

FIG. 1 is a cross-sectional view of one embodiment of a caliper tool 100 of the present invention in a tubular 10. For illustrative purposes, the caliper tool 100 will be described hereafter as it relates to a pig. It should be understood, however, that the principles of the present invention may apply to any number of tools, such as intelligent tools.

The tool 100 includes a plurality of individual caliper arm assemblies 150 disposed around an end body 160. The caliper arm assembly 150 will be described generally as it relates to the entire tool 100 in FIG. 1 and in more detail in FIG. 2. As shown in FIG. 1, each caliper arm assembly 150 includes an arm 130 or a sensing member. Each arm 130 includes a roller member 135 disposed at an end thereof. It should be understood, however, that the invention is not limited to roller members but rather any type of surface member may be employed without departing from principles of the present invention, such as a sliding shoe or skid.

As illustrated in FIG. 1, the arm 130 is biased outward by a biasing member 180 to allow the roller member 135 to contact the interior surface of the tubular 10. As the tool 100 travels through the tubular 10, each caliper arm assembly 150 independently responds to geometric anomalies or other changes in the configuration of the interior of the tubular 10, such as dents, protrusions or bulges. Upon sensing a change in configuration of the tubular 10, each caliper arm assembly 150 sends an independent electronic signal to a computer assembly 145 or data receiver indicating the change in configuration. The electronic signal from each caliper arm assembly 150 is collected and stored in the computer assembly 145 which is subsequently used in conjunction with other electronic signals, such as an electronic signal from odometer wheels 125 which is collected and stored in the computer assembly 145, to indicate the condition of the interior surface of the tubular 10. Although the tool 100 in FIG. 1 shows two caliper arm assemblies 150, any number of caliper arm assemblies 150 may be employed without departing from principles of the present invention. Furthermore, the caliper arm assemblies 150 may be positioned at any location along the tool 100 without departing from principles of the present invention. Additionally, the caliper arm assemblies 150 are arranged and configured around the tool 100 to obtain data from substantially the entire circumferential interior surface of the tubular 10.

The tool 100 also includes a body 105 disposed between a pair of forward cups 110 and a pair of rear cups 115. The cups 110, 115 position the tool 100 centrally within the tubular 10 and provide a means for propelling the tool 100 through the tubular 10. It should be understood, however, that the invention is not limited to cups but rather any type of drive member may be employed without departing from principles of the present invention, such as a crawler arrangement or a wireline arrangement.

Typically, the cups 110, 115 have a larger outer diameter than the inner diameter of the surrounding tubular 10 and one of the cups 110, 115 and preferably the forward cups 110 has a controlled permeability to fluid flow. Therefore, after the tool 100 is inserted into the tubular 10, fluid flow acts against the cups 110, 115 and urges the tool 100 through the tubular 10. The rear cups 115 may also have a controlled permeability to fluid flow or the rear cups 115 may include a hole to allow fluid flow to act against the forward cups 110 to urge the tool 100 through the tubular 10. The cups 110, 115 may be made from any type of material, such as polyurethane. Furthermore, it should be understood that the cups 110, 115 may be arranged in a disk shape without departing from principles of the present invention, such as the disks in a typical "disk pig".

The tool 100 further includes the computer assembly 145. The computer assembly 145 is typically disposed in the body 105 for receiving, processing, and storing electronic signals generated by the tool 100. For instance, the computer assembly 145 receives electronic signals from components in the tool 100 such as each individual caliper arm assembly 150 and the odometer wheels 125 and then stores data regarding the characteristics of the interior of the tubular 10 as the tool 100 passes therethrough. In one embodiment, the computer assembly 145 records the characteristic data in regards to a frame of reference in the tubular 10. The computer assembly 145 may also include an electronic clock arrangement, batteries, and other circuits for storage of data.

The tool 100 further includes a plurality of front arms 120 disposed adjacent the forward cups 110. Each front arm 120 is operatively attached to the body 105 and includes an odometer wheel 125 at an end thereof. The odometer wheel 125 is rotationally attached to the arm 120 to provide an electronic signal to the computer assembly 145 to indicate the distance the tool 100 has traveled through the tubular 10. The electronic signal is stored in the computer assembly 145, which is subsequently used in conjunction with other electronic signals to indicate the condition of an interior surface of the tubular 10. Although the tool 100 in FIG. 1 shows two front arms 120 each having a wheel 125 attached thereto, any number of wheels and arms may be employed without departing from principles of the present invention. Furthermore, the arms 120 and the wheels 125 may be positioned at any location along the tool 100 without departing from principles of the present invention.

Figure 2:
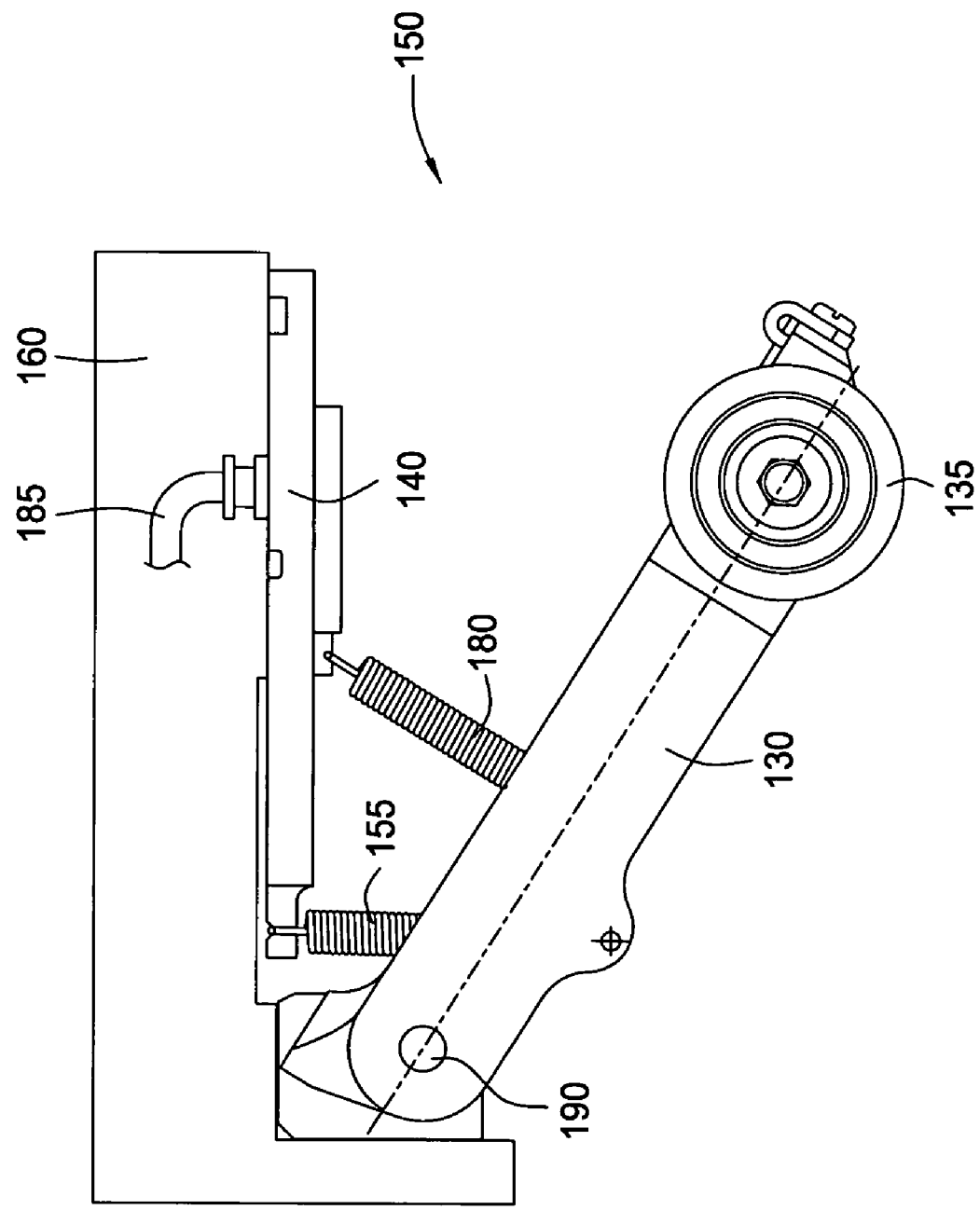
FIG. 2 is a view illustrating a caliper arm assembly of the caliper tool.

FIG. 2 is an enlarged view illustrating the caliper arm assembly 150. The tool 100 may employ any number of caliper arm assemblies 150 depending on the application and the size of the tubular 10. For instance, a smaller diameter tubular may only require a tool 100 with a small number of caliper arm assemblies 150, while a larger diameter tubular may require a tool 100 with a large number of caliper arm assemblies 150. In this respect, the tool 100 may include any number of caliper arm assemblies 150 without departing from principles of the present invention. Furthermore, to maximize common parts usage and simplify the analysis of the data captured, the working geometry of the caliper arms 130 on the different sized tools is identical. In other words, the angle that the caliper arm 130 makes to the supporting body in the extended or neutral position is the same for all tools, and the change of angle that the arm 130 can experience in a deflected position is the same for all tools. Accordingly, a single design of the sensor 140 and its signal amplifier and the computer assembly 145 serves the various sized tools.

Each independent caliper arm assembly 150 includes the caliper arm 130 which is pivotally attached to the end body 160 by a connection member 190, such as a pin. The arm 130 is rotatable around the connection member 190 between a neutral position as illustrated in FIG. 1 to an extended position or a retracted position. Further, the arm 130 is biased away from the end body 160 by the biasing member 180, such as a spring. The biasing member 180 is used to ensure that the roller member 135 on the caliper arm 130 remains in substantial contact with the interior surface of the surrounding tubular (not shown) as the tool 100 travels therethrough.

An end of the caliper arm 130 is attached to a force sensor 140 by a biasing member 155, such as a spring, an elastic member or another mechanical linkage. The biasing member 155 is constructed and arranged to transmit a force signal from the caliper arm 130 to the sensor 140 as the roller member 135 on the caliper arm 130 responds to geometric anomalies or other changes in the configuration of the interior of the tubular, such as dents, protrusions, or bulges. The force signal is a selective signal, whereby the force signal is sent when the arm 130 moves from the neutral position to the extended position or the retracted position. Additionally, the force signal may vary in intensity. For instance, as the roller member 135 responds to a small protrusion in the tubular, the caliper arm 130 rotates around the connection member 190 a few degrees. In turn, the caliper arm 130 moves the biasing member 155 a small amount which results in a small force signal being transmitted to the force sensor 140. In contrast, as the roller member 135 responds to a large protrusion in the tubular, the caliper arm 130 rotates further around the connection member 190, which results in a larger force signal being transmitted to the force sensor 140. In this manner, the intensity of the force signal sent to the sensor may be used to accurately represent the condition of the tubular.

The sensor 140 receives the force signal transmitted through the biasing member 155 and then sends another signal through a wire 185 to a signal amplifier (not shown). Thereafter, the amplifier communicates an electronic signal to a recording device in the computer assembly 145. The electronic signal is stored in the computer assembly 145 which is subsequently used in conjunction with other electronic signals, such as the electronic signal from the odometer wheels 125, to indicate the condition of the interior surface of the tubular 10. It should be noted that each caliper arm assembly 150 has an individual force sensor 140 and an individual signal amplifier. Therefore, each caliper arm assembly 150 is a separate component. In other words, each caliper arm assembly 150 may operate independently from other caliper arm assemblies 150 which results in an accurate representative of the physical condition of the tubular.

In one embodiment, the force sensor 140 is a cantilever beam arrangement which is fitted with strain gauges to measure the deflection of the cantilever beam as the force signal is applied thereto. The output of the strain gauges is measured using the signal amplifier to give a measure of the angle of the caliper arm 130 relative to the end body 160. This dimensional data from the signal amplifier is correlated with other data, such as prior measurements and/or other stored data to determine the physical condition of the tubular. Typically, the tool 100 is calibrated by setting the caliper arm 130 to a series of predetermined positions and read and record the output of the sensor 140 at each position. This data is processed to create a geometry versus output characteristic, which is later used during the analysis of the stored caliper data to determine the geometry of the pipeline from the sensor output data stored as the tool 100 traveled through the tubular 10, using the characteristic function in reverse.

Further, in one embodiment, the force sensor 140 in each caliper arm assembly 150 may be configured for a specific application or type of tubular. For instance, the force sensor 140 may be configured to send a signal to the amplifier upon receipt of a predetermined amount of force. In this manner, the tool 100 with individual caliper arm assemblies 150 may be used for any number of operations. Additionally, it should be noted that the force sensor 140 is not limited to this embodiment but rather the force sensor 140 may be any type of sensor capable of receiving a force signal and transmitting another signal.

In operation, the tubular is typically cleaned by a dumb pig (not shown) and thereafter a detailed inspection of the interior of the tubular is performed by a caliper tool. Preferably, the tool is introduced at one end of the tubular through a pig launcher (not shown). Thereafter, fluid pressure acting on the cups of the tool urges the tool through the tubular. As the tool travels through the tubular, each individual caliper assembly responds to geometric anomalies or other changes in the configuration of the interior of the tubular, such as dents, protrusions, or bulges, changes in the configuration of the tubular. For instance, an arm of the caliper arm assembly is urged radially inward in response to a protrusion formed in the interior of the tubular. The radial movement of the arm sends an electronic signal to the computer assembly indicating the change in configuration. The electronic signal is stored in the computer assembly which is subsequently used in conjunction with other electronic signals, such as the electronic signal from the odometer wheels on the tool, to indicate the condition of the interior surface of the tubular.

After the tool has traveled substantially the entire length of the tubular collecting data regarding the interior condition of the tubular, the tool is typically caught in a pig trap and then removed from the tubular. Subsequently, the data relating to the condition of the tubular is downloaded from the computer assembly in the tool. The data contains many different aspects of the interior surface of the tubular, for instance the location and depth of the protrusion formed in the tubular. This data is then used to determine a variety of different and independent tubular factors such as debris deposits, protrusions, joints, and bends, the combination of which will provide an overall tubular condition profile. The data can be analyzed using an appropriate computer program to produce displays on video or printed information, ether numeric or graphic.

While the foregoing is directed to embodiments of the present invention, other and further embodiments of the invention may be devised without departing from the basic scope thereof, and the scope thereof is determined by the claims that follow.

The invention claimed is:

1. An apparatus for use in a tubular, comprising:
   a body;
   a drive member attached to the body for urging the apparatus through the tubular; and
   at least two independent caliper assemblies disposed on the body, each caliper assembly is capable of generating data representative of an interior surface of the tubular and each caliper assembly includes an independent force sensor attached to a sensing member via a biasing member, wherein the biasing member is configured to transmit a signal to the force sensor as the sensing member rotates relative to the body.

2. The apparatus of claim 1, further including a second biasing member between the sensing member and the body, the second biasing member configured to bias the sensing member away from the body.

3. The apparatus of claim 1, wherein the biasing member is a spring.

4. The apparatus of claim 1, further including an odometer member configured to indicate the distance the apparatus has moved through the tubular.

5. The apparatus of claim 1, further including a data receiver configured to collect and store data from each independent caliper assembly.

6. The apparatus of claim 1, wherein each independent caliper assembly further includes a signal amplifier to receive and amplify signals from the force sensor.

7. The apparatus of claim 1, wherein the force sensor is configured to send a signal upon receipt of a predetermined force signal.

8. The apparatus of claim 1, wherein the sensing member is an arm with a wheel at an end thereof for contacting the interior surface of the tubular.

9. The apparatus of claim 1, wherein the caliper assemblies are arranged around the body to obtain data from substantially an entire circumferential interior surface of the tubular.

10. The apparatus of claim 1, wherein the drive member includes at least one flow cup.

11. A method for obtaining data in a tubular, comprising:

urging a measurement tool through the tubular, the measurement tool having a body and at least two independent caliper assemblies, wherein each caliper assembly includes an independent force sensor attached to a sensing member via a biasing member;

sensing a change in a configuration of an interior surface of the tubular by the sensing member;

sending a signal from the sensing member to the force sensor via the biasing member as the sensing member rotates relative to the body due to the change in the configuration of the interior surface of the tubular; and collecting and storing data from each independent force sensor, wherein the data is characteristic of the change in the configuration of the interior surface of the tubular.

12. The method of claim 11, further including analyzing the data to determine the condition of the tubular.

13. The method of claim 11, further including generating data representative of the position of the measurement tool along the tubular.

14. The method of claim 11, wherein the biasing member is a spring.

15. The method of claim 11, further including calibrating the force sensor to respond to a predetermined force signal.

16. An apparatus for collecting data in a tubular, comprising:

a body having a drive member configured to urge the apparatus through the tubular;

at least two caliper assemblies disposed on the body, each caliper assembly is capable of generating independent data representative of an interior surface of the tubular and each caliper assembly includes an independent force sensor attached to an arm via a biasing member, wherein the biasing member is configured to transmit a signal to the force sensor as the arm rotates relative to the body; and a computer assembly for collecting and storing data from each caliper assembly.

17. The apparatus of claim 16, wherein the biasing member is a spring.

18. The apparatus of claim 16, further including an odometer member to indicate the distance the apparatus has moved through the tubular.

19. The apparatus of claim 16, wherein the force sensor is configured to receive a predetermined force signal.

20. The apparatus of claim 16, further including a second biasing member between the arm and the body, the second biasing member configured to bias the arm away from the body.

* * * * *